US012048924B2

(12) United States Patent
Krasheninin et al.

(10) Patent No.: US 12,048,924 B2
(45) Date of Patent: Jul. 30, 2024

(54) PIPETTE TIPS AND METHODS AND SYSTEMS INCLUDING SAME

(71) Applicant: Revvity Health Sciences, Inc., Waltham, MA (US)

(72) Inventors: Vladimir Krasheninin, Upton, MA (US); Baton R. Mannino, Millis, MA (US)

(73) Assignee: Revvity Health Sciences, Inc., Waltham, MA (US)

( * ) Notice: Subject to any disclaimer, the term of this patent is extended or adjusted under 35 U.S.C. 154(b) by 236 days.

(21) Appl. No.: 17/145,533

(22) Filed: Jan. 11, 2021

(65) Prior Publication Data

US 2021/0213440 A1 Jul. 15, 2021

Related U.S. Application Data

(60) Provisional application No. 62/961,416, filed on Jan. 15, 2020.

(51) Int. Cl.
*B01L 3/02* (2006.01)

(52) U.S. Cl.
CPC .................................. *B01L 3/0275* (2013.01)

(58) Field of Classification Search
CPC ..................................................... B01L 3/0275
See application file for complete search history.

(56) References Cited

U.S. PATENT DOCUMENTS

| | | | | |
|---|---|---|---|---|
| 6,171,553 | B1 * | 1/2001 | Petrek | B01L 3/0275 422/522 |
| 7,270,284 | B2 | 9/2007 | Liao et al. | |
| 8,202,495 | B1 | 6/2012 | Smith | |
| D663,042 | S | 7/2012 | Motadel et al. | |
| 8,307,721 | B2 | 11/2012 | Motadel | |
| D679,828 | S | 4/2013 | Motadel et al. | |
| D680,226 | S | 4/2013 | Motadel et al. | |
| D687,562 | S | 8/2013 | Motadel et al. | |
| D691,282 | S | 10/2013 | Motadel et al. | |
| 2010/0218622 | A1 | 9/2010 | Motadel | |

(Continued)

FOREIGN PATENT DOCUMENTS

| | | | |
|---|---|---|---|
| CN | 101484242 | A | 7/2009 |
| CN | 110465342 | A | 11/2019 |

(Continued)

OTHER PUBLICATIONS

Stress-Strain Behavior of Polymers, 2016, Polymerdatabase (Year: 2016).*

(Continued)

*Primary Examiner* — Lyle Alexander
*Assistant Examiner* — Mickey Huang
(74) *Attorney, Agent, or Firm* — Myers Bigel, P.A.

(57) ABSTRACT

A pipette tip for use with a pipettor including a pipettor shaft having a terminal end has opposed proximal and distal ends and includes a tubular body and a coupling portion. The tubular body extends between the proximal and distal ends. The tubular body define a fluid passage terminating at a proximal opening adjacent the proximal end and a distal opening adjacent the distal end. The coupling portion is located on the proximal end. The coupling portion includes an interlock feature configured to mechanically interlock with the pipettor shaft proximate the terminal end to selectively and releasably secure the pipette tip to the pipettor shaft.

20 Claims, 6 Drawing Sheets

(56) References Cited

U.S. PATENT DOCUMENTS

| | | | |
|---|---|---|---|
| 2011/0183433 | A1 | 7/2011 | Motadel et al. |
| 2012/0213677 | A1 | 8/2012 | Petrek |
| 2012/0306190 | A1 | 12/2012 | Motadel |
| 2013/0164194 | A1 | 6/2013 | Motadel et al. |

FOREIGN PATENT DOCUMENTS

| | | | |
|---|---|---|---|
| CN | 110523452 | A | 12/2019 |
| DE | 102006036764 | A1 | 2/2008 |
| EP | 1862219 | A1 | 12/2007 |
| WO | 0062933 | A1 | 10/2000 |

OTHER PUBLICATIONS

Aurora Harley, Touch Targets on Touchscreens, Mar. 5, 2019, Nielsen Norman Group (Year: 2019).*

Notification of Transmittal of the International Search Report and the Written Opinion of the International Searching Authority, or the Declaration, in corresponding PCT Application No. PCT/US2021/012902 (12 pages) (Apr. 8, 2021).

FlexFit datasheet, Biotix, Inc., Retrieved from: http:.//www.biotix.com/technology/flexfit (2 pages) (Retrieved on: Oct. 18, 2013).

Superior Laboratory Ergonomics in the Biotix Universal Pipette Tip Technical Bulletin, Biotix Inc. (6 pages) (2012).

Chinese Office action corresponding to Chinese Patent Application No. 202180009124.4 (Foreign Text, 13 Pages, English Translation Thereof, 15 Pages) (Sep. 6, 2023).

Harley, Aurora “Touch Targets on Touchscreens” Nielsen Norman Group (14 pages) (May 5, 2019).

* cited by examiner

PIPETTE TIPS AND METHODS AND SYSTEMS INCLUDING SAME

CROSS-REFERENCE TO RELATED APPLICATION

The present application claims the benefit of and priority from U.S. Provisional Patent Application No. 62/961,416 filed Jan. 15, 2020, the entire content of which is incorporated herein by reference.

FIELD

The present technology relates to pipette tips and, more particularly, to pipette tips that can be replaceably mounted on a pipettor shaft.

BACKGROUND

Many research and/or manufacturing processes require the delivery or transport of a precise amount of liquid. Precisely controlling the aspiration and/or dispensation of liquid can be important in producing accurate test results and high quality products, as well as being important in reducing the costs associated with such operations. Pipette tips are commonly employed for delivering precise amounts of liquid. In particular, it is known to removably and replaceably mount a pipette tip on a dispensing device (e.g., a manual or automated apparatus). For example, the pipette tip may be mounted on a pipettor shaft or mandrel.

SUMMARY

According to embodiments of the technology, a pipette tip for use with a pipettor including a pipettor shaft having a terminal end has opposed proximal and distal ends and includes a tubular body and a coupling portion. The tubular body extends between the proximal and distal ends. The tubular body defines a fluid passage terminating at a proximal opening adjacent the proximal end and a distal opening adjacent the distal end. The coupling portion is located on the proximal end. The coupling portion includes an interlock feature configured to mechanically interlock with the pipettor shaft proximate the terminal end to selectively and releasably secure the pipette tip to the pipettor shaft.

In some embodiments, the interlock feature includes a circumferentially extending rib or groove configured to interlock with a cooperating groove or rib on the pipettor shaft.

In embodiments, the interlock feature includes a circumferentially extending rib configured to interlock with a cooperating annular groove on the pipettor shaft.

In certain embodiments, the body and the coupling portion are formed of different materials, and the material of the coupling portion is less stiff than the material of the body.

According to some embodiments, the durometer (hardness) of the material of the body is at least 60 Shore D and the durometer of the material of the coupling portion is less than 70 Shore A.

In some embodiments, the material of the body includes polypropylene or polyethylene, and the material of the coupling portion includes a thermoplastic elastomer (TPE).

In some embodiments, the coupling portion includes a stop shoulder configured to engage the terminal end and thereby limit insertion of the pipettor shaft into the coupling portion. The present disclosure also includes embodiments where the coupling portion includes an integral, annular sealing rib on an inner diameter, and the sealing rib is adapted to form a fluid-tight seal with an outer diameter of the pipettor shaft when the pipettor shaft is inserted into the coupling portion and interlocked with the interlock feature. The coupling portion may include a plurality of integral, circumferentially distributed coupling tabs, where the coupling tabs are configured to be radially outwardly displaced by the pipettor shaft when the pipettor shaft is inserted into the coupling portion, and the interlock feature is located on at least one of the coupling tabs.

In certain embodiments, the fluid-tight seal is gas-tight up to at least 5 psi.

In some embodiments, the body and the sealing rib are formed of different materials, and the material of the sealing rib is less stiff than the material of the body.

In embodiments, the interlock feature includes a circumferentially extending rib or groove configured to interlock with a cooperating groove or rib on the pipettor shaft, while in some embodiments, the interlock feature includes a circumferentially extending rib configured to interlock with a cooperating annular groove on the pipettor shaft.

According to some embodiments, the body and the coupling tabs are formed of different materials, and the material of the coupling tabs is less stiff than the material of the body.

Accordingly, in embodiments, the interlock feature may include a circumferentially extending rib or groove configured to interlock with a cooperating groove or rib on the pipettor shaft, the coupling portion includes a stop shoulder configured to engage the terminal end and thereby limit insertion of the pipettor shaft into the coupling portion, the coupling portion includes an integral, annular sealing rib on an inner diameter, the sealing rib is adapted to form a fluid-tight seal with an outer diameter of the pipettor shaft when the pipettor shaft is inserted into the coupling portion and interlocked with the interlock feature, the body and the sealing rib are formed of different materials, and the material of the sealing rib is less stiff than the material of the body.

Also disclosed are methods for mounting a pipette tip on a pipettor shaft having a terminal end, where the methods include providing a pipette tip, the pipette tip having opposed proximal and distal ends and including: a tubular body extending between the proximal and distal ends, the tubular body defining a fluid passage terminating at a proximal opening adjacent the proximal end and a distal opening adjacent the distal end; and a coupling portion on the proximal end, the coupling portion including an interlock feature configured to mechanically interlock with the pipettor shaft proximate the terminal end to selectively and releasably secure the pipette tip to the pipettor shaft. The methods include inserting the terminal end of the pipettor shaft into the coupling portion to mechanically interlock the interlock feature with the pipettor shaft proximate the terminal end and thereby releasably secure the pipette tip to the pipettor shaft.

In some embodiments, the interlock feature includes a circumferentially extending rib or groove, and the circumferentially extending rib or groove interlocks with a cooperating groove or rib on the pipettor shaft when the terminal end of the pipettor shaft is inserted into the coupling portion.

In embodiments, the interlock feature includes a circumferentially extending rib configured to interlock with a cooperating annular groove on the pipettor shaft.

In certain embodiments, the body and the coupling portion are formed of different materials, and the material of the coupling portion is less stiff than the material of the body.

In some embodiments, the durometer of the material of the body is at least 60 Shore D, and the durometer of the material of the coupling portion is less than 70 Shore A.

In some embodiments, the material of the body includes polypropylene, and the material of the coupling portion includes a thermoplastic elastomer.

In some embodiments, the coupling portion includes a stop shoulder that engages the terminal end and thereby limits insertion of the pipettor shaft into the coupling portion when the terminal end of the pipettor shaft is inserted into the coupling portion.

The present disclosure also includes embodiments where the coupling portion includes an integral, annular sealing rib on an inner diameter, and the sealing rib forms a fluid-tight seal with an outer diameter of the pipettor shaft when the pipettor shaft is inserted into the coupling portion and interlocked with the interlock feature. The coupling portion may include a plurality of integral, circumferentially distributed coupling tabs, where the coupling tabs are radially outwardly displaced by the pipettor shaft when the pipettor shaft is inserted into the coupling portion, and the interlock feature is located on at least one of the coupling tabs.

In certain embodiments, the fluid-tight seal is gas-tight up to at least 5 psi.

In certain embodiments, the body and the sealing rib are formed of different materials, and the material of the sealing rib is less stiff than the material of the body.

In some embodiments, the coupling portion includes a plurality of integral, circumferentially distributed coupling tabs, the coupling tabs are radially outwardly displaced by the pipettor shaft when the pipettor shaft is inserted into the coupling portion, and the interlock feature is located on at least one of the coupling tabs.

In some embodiments, the interlock feature includes a circumferentially extending rib or groove, and the circumferentially extending rib or groove interlocks with a cooperating groove or rib on the pipettor shaft when the terminal end of the pipettor shaft is inserted into the coupling portion, while in some embodiments, the interlock feature includes a circumferentially extending rib configured to interlock with a cooperating annular groove on the pipettor shaft.

According to some embodiments, the body and the coupling tabs are formed of different materials, and the material of the coupling tabs is less stiff than the material of the body.

According to some methods, the interlock feature includes a circumferentially extending rib or groove, the circumferentially extending rib or groove interlocks with a cooperating groove or rib on the pipettor shaft when the terminal end of the pipettor shaft is inserted into the coupling portion, the coupling portion includes a stop shoulder that engages the terminal end and thereby limits insertion of the pipettor shaft into the coupling portion when the terminal end of the pipettor shaft is inserted into the coupling portion, the coupling portion includes an integral, annular sealing rib on an inner diameter, the sealing rib forms a fluid-tight seal with an outer diameter of the pipettor shaft when the pipettor shaft is inserted into the coupling portion and interlocked with the interlock feature, the body and the sealing rib are formed of different materials, and the material of the sealing rib is less stiff than the material of the body.

Also disclosed are pipetting systems that include a pipettor and a pipette tip. The pipettor includes a pipettor shaft having a terminal end. The pipette tip has opposed proximal and distal ends and includes a tubular body and a coupling portion. The tubular body extends between the proximal and distal ends. The tubular body defines a fluid passage terminating at a proximal opening adjacent the proximal end and a distal opening adjacent the distal end. The coupling portion is located on the proximal end. The coupling portion includes an interlock feature configured to mechanically interlock with the pipettor shaft proximate the terminal end to selectively and releasably secure the pipette tip to the pipettor shaft.

In some embodiments, the interlock feature includes a circumferentially extending rib or groove configured to interlock with a cooperating groove or rib on the pipettor shaft.

In embodiments, the interlock feature includes a circumferentially extending rib configured to interlock with a cooperating annular groove on the pipettor shaft.

In certain embodiments, the body and the coupling portion are formed of different materials, and the material of the coupling portion is less stiff than the material of the body.

According to some embodiments, the durometer (hardness) of the material of the body is at least 60 Shore D and the durometer of the material of the coupling portion is less than 70 Shore A.

In some embodiments, the material of the body includes polypropylene or polyethylene, and the material of the coupling portion includes a thermoplastic elastomer (TPE).

In some embodiments, the coupling portion includes a stop shoulder configured to engage the terminal end and thereby limit insertion of the pipettor shaft into the coupling portion. The present disclosure also includes embodiments where the coupling portion includes an integral, annular sealing rib on an inner diameter, and the sealing rib is adapted to form a fluid-tight seal with an outer diameter of the pipettor shaft when the pipettor shaft is inserted into the coupling portion and interlocked with the interlock feature. The coupling portion may include a plurality of integral, circumferentially distributed coupling tabs, where the coupling tabs are configured to be radially outwardly displaced by the pipettor shaft when the pipettor shaft is inserted into the coupling portion, and the interlock feature is located on at least one of the coupling tabs.

In certain embodiments, the fluid-tight seal is gas-tight up to at least 5 psi.

In some embodiments, the body and the sealing rib are formed of different materials, and the material of the sealing rib is less stiff than the material of the body.

In embodiments, the interlock feature includes a circumferentially extending rib or groove configured to interlock with a cooperating groove or rib on the pipettor shaft, while in some embodiments, the interlock feature includes a circumferentially extending rib configured to interlock with a cooperating annular groove on the pipettor shaft.

According to some embodiments, the body and the coupling tabs are formed of different materials, and the material of the coupling tabs is less stiff than the material of the body.

Accordingly, in embodiments, the interlock feature may include a circumferentially extending rib or groove configured to interlock with a cooperating groove or rib on the pipettor shaft, the coupling portion includes a stop shoulder configured to engage the terminal end and thereby limit insertion of the pipettor shaft into the coupling portion, the coupling portion includes an integral, annular sealing rib on an inner diameter, the sealing rib is adapted to form a fluid-tight seal with an outer diameter of the pipettor shaft when the pipettor shaft is inserted into the coupling portion and interlocked with the interlock feature, the body and the sealing rib are formed of different materials, and the material of the sealing rib is less stiff than the material of the body.

Also disclosed are pipette tips for use with a pipettor, where the pipettor includes a pipettor shaft having a terminal end has opposed proximal and distal ends and includes a tubular body and a coupling portion. The tubular body extends between the proximal and distal ends. The tubular body defines a fluid passage terminating at a proximal opening adjacent the proximal end and a distal opening adjacent the distal end. The coupling portion is located on the proximal end and is configured to selectively and releasably secure the pipette tip to the pipettor shaft. The coupling portion includes a plurality of integral, circumferentially distributed coupling tabs configured to be radially outwardly displaced by the pipettor shaft when the pipettor shaft is inserted into the coupling portion.

According to further embodiments of the technology, disclosed are methods for mounting a pipette tip on a pipettor shaft having a terminal end, where the methods include providing a pipette tip having opposed proximal and distal ends and including: a tubular body extending between the proximal and distal ends, the tubular body defining a fluid passage terminating at a proximal opening adjacent the proximal end and a distal opening adjacent the distal end; and a coupling portion on the proximal end and configured to selectively and releasably secure the pipette tip to the pipettor shaft, the coupling portion including a plurality of integral, circumferentially distributed coupling tabs configured to be radially outwardly displaced by the pipettor shaft when the pipettor shaft is inserted into the coupling portion. The method further includes inserting the terminal end of the pipettor shaft into the coupling portion to thereby releasably secure the pipette tip to the pipettor shaft.

According to further embodiments of the technology, disclosed are pipetting systems that include a pipettor and a pipette tip. The pipettor includes a pipettor shaft having a terminal end. The pipette tip has opposed proximal and distal ends and includes: a tubular body extending between the proximal and distal ends, the tubular body defining a fluid passage terminating at a proximal opening adjacent the proximal end and a distal opening adjacent the distal end; and a coupling portion on the proximal end and configured to selectively and releasably secure the pipette tip to the pipettor shaft, the coupling portion including a plurality of integral, circumferentially distributed coupling tabs configured to be radially outwardly displaced by the pipettor shaft when the pipettor shaft is inserted into the coupling portion.

Further features, advantages and details of the present technology will be appreciated by those of ordinary skill in the art from a reading of the figures and the detailed description of the preferred embodiments that follow, such description being merely illustrative of the present technology.

DETAILED DESCRIPTION

Figure 1:
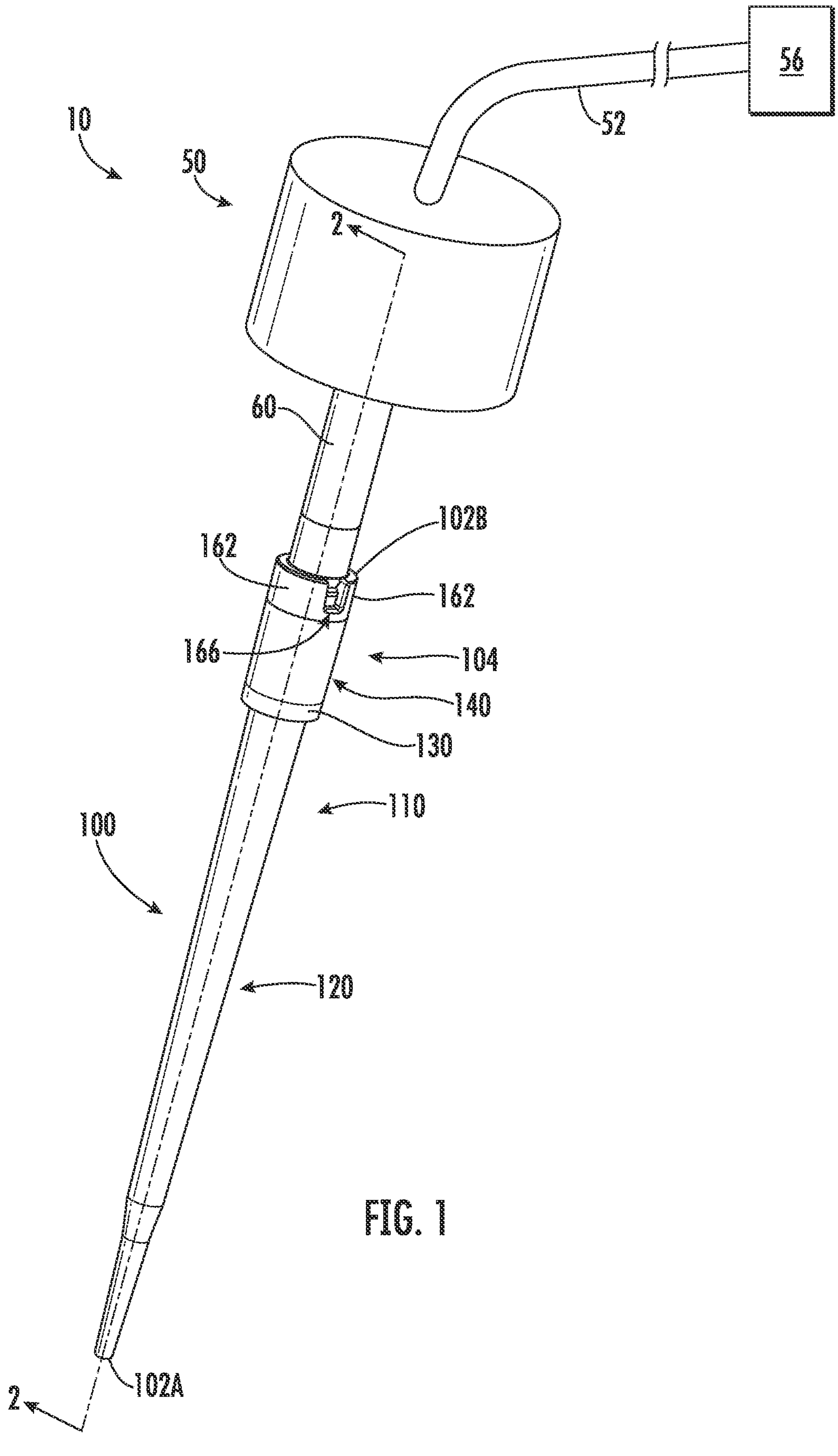
FIG. 1 is a perspective view of a pipetting system according to embodiments of the technology.

The present technology now will be described more fully hereinafter with reference to the accompanying drawings, in which illustrative embodiments of the technology are shown. In the drawings, the relative sizes of regions or features may be exaggerated for clarity. This technology may, however, be embodied in many different forms and should not be construed as limited to the embodiments set forth herein; rather, these embodiments are provided so that this disclosure will be thorough and complete, and will fully convey the scope of the technology to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present technology.

Spatially relative terms, such as “beneath”, “below”, “lower”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the exemplary term “below” can encompass both an orientation of above and below; The device may be otherwise oriented (rotated 90° or at other orientations) and the spatially relative descriptors used herein interpreted accordingly.

As used herein, the singular forms “a”, “an” and “the” are intended to include the plural forms as well, unless expressly stated otherwise. It will be further understood that the terms “includes,” “comprises.” “including” and/or “comprising.” when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being “connected” or “coupled” to another element, it can be directly connected or coupled to the other element or intervening elements may be present. As used herein, the term “and/or” includes any and all combinations of one or more of the associated listed items.

The term “monolithic” means an object that is a single, unitary piece formed or composed of a material without joints or seams.

Figure 2:
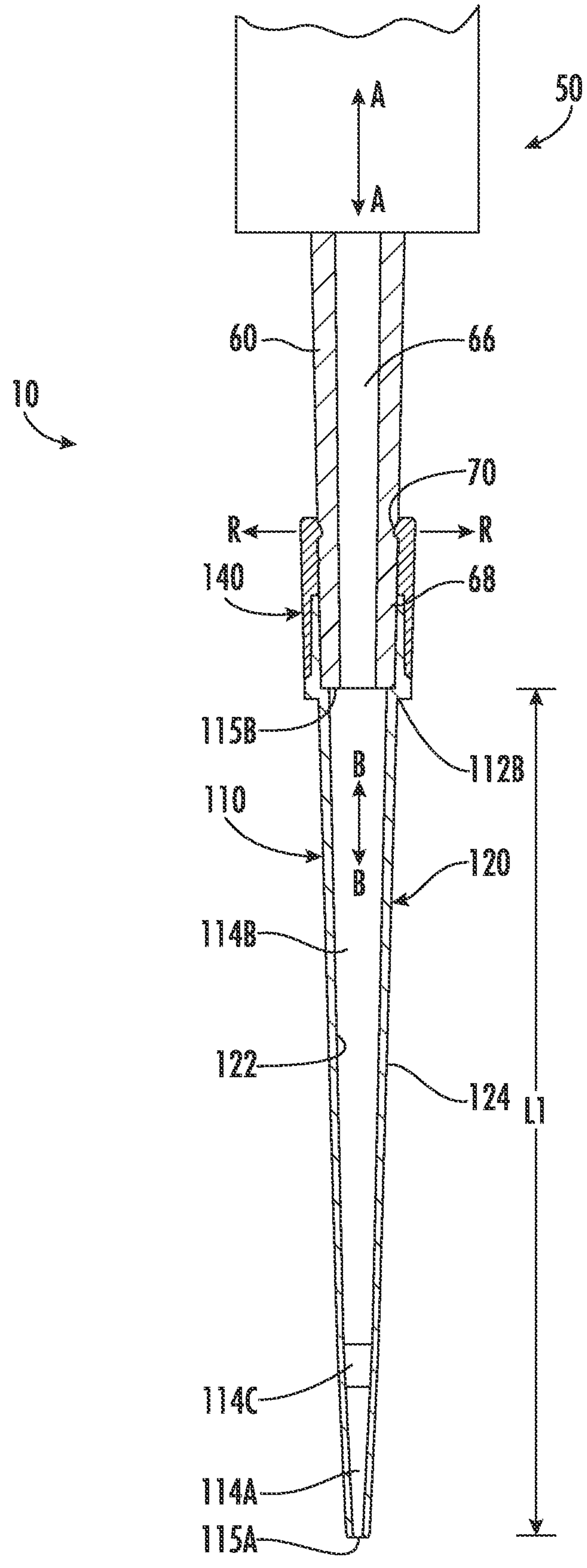
FIG. 2 is a fragmentary, cross-sectional view of the pipetting system of FIG. 1 taken along the line 2-2 of FIG. 1.
Figure 3:
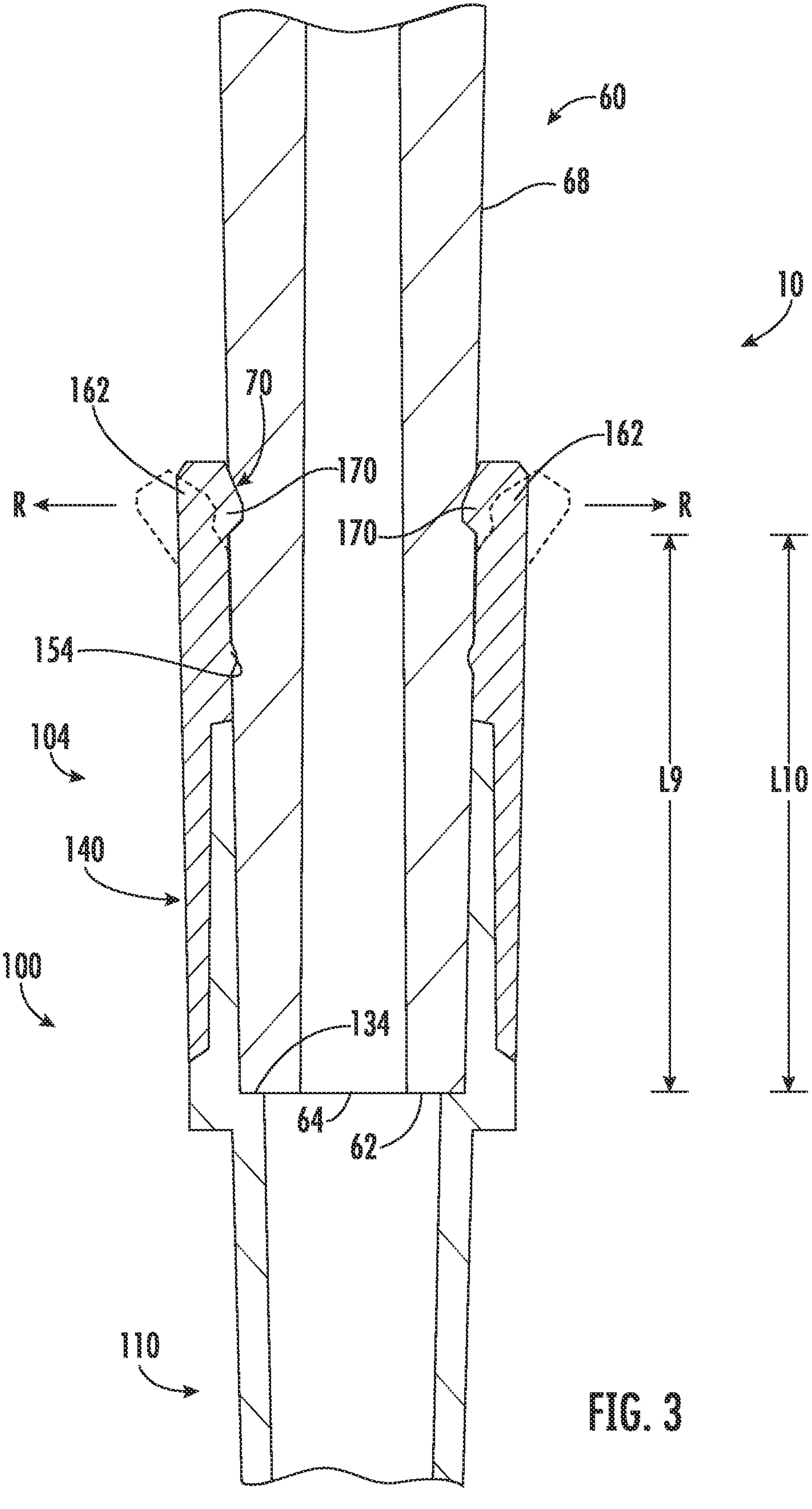
FIG. 3 is an enlarged fragmentary, cross-sectional view of the pipetting system of FIG. 1 taken along the line 2-2 of FIG. 1.

With reference to FIGS. 1-6, a pipette tip 100 according to embodiments of the technology is shown therein. The pipette tip 100 may be mounted on a pipettor device 50 in a pipetting system 10, as shown in FIGS. 1-3, for example. The pipette tip 100 extends from a distal end 102A to a proximal end 102B and defines a pipette tip axis B-B (FIG. 2). The pipette tip 100 includes a body portion 120 adjacent the pipette tip distal end 102A and a coupling portion 104 adjacent the pipette tip proximal end 102B. The illustrated pipette tip 100 includes a body member 110 and a coupling member 140. In the illustrated embodiment, the body portion 120 forms a part of the body member 110 and the coupling portion 104 includes the coupling member 140 and a proximal portion 130 (FIG. 6) of the body member 110.

Figure 6:
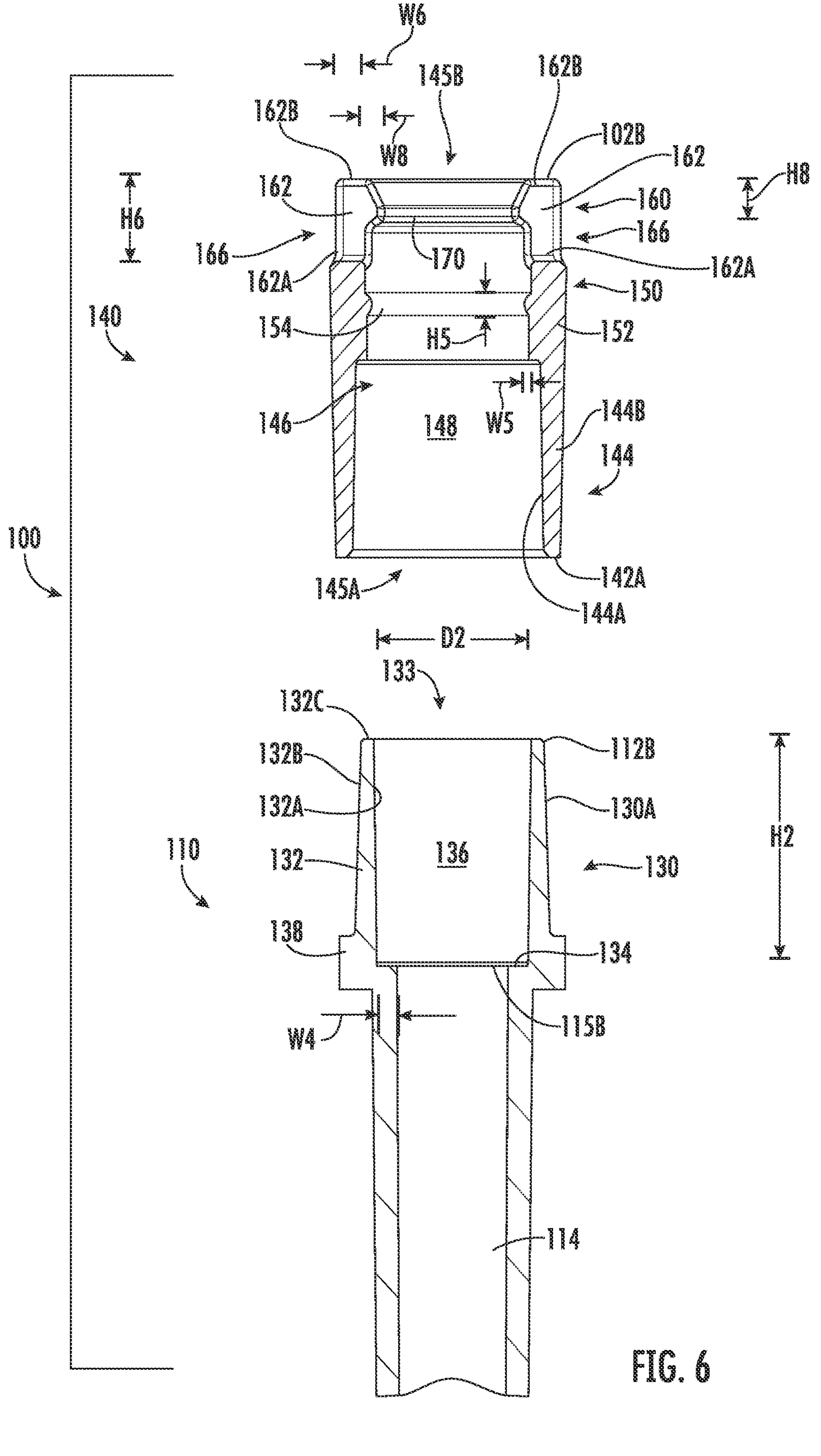
FIG. 6 is a fragmentary, exploded, cross-sectional view of a pipette tip forming a part of the pipetting system of FIG. 1 taken along the line 6-6 of FIG. 5.

With reference to FIGS. 2 and 6, the body member 110 is tubular and extends from a body member proximal end 112B to the pipette tip distal end 102A. A frustoconical internal bore or through passage 114 extends axially fully through the body member 110 and terminates at a distal end opening 115A and a proximal end opening 115B. In some embodiments, the passage 114 tapers in the direction of the distal end opening 115A. In some embodiments, the passage 114 includes one or more sections, e.g., 114A. 114B. 114C, and in embodiments, the one or more sections may have different inner diameters and/or rates of taper. The illustrated body portion 120 includes an inner surface 122 (defining at least a portion of the passage 114) and a frustoconical outer surface 124 (which tapers in correspondence with the passage sections 114A. 114B. 114C).

As shown in the FIG. 6 embodiment (bottom portion), the body member proximal portion 130 includes a tubular or annular flange or side wall 132 including an inner surface 132A, an outer surface 132B, and a proximal end face 132C. The inner surface 132A defines a socket 136 and a socket proximal end opening 133 in communication therewith. In some embodiments, the socket 136 is substantially cylindrical. In the illustrated embodiment, an annular inner flange or stop shoulder 134 is located at the bottom of the socket 136 and extends radially inwardly from the side wall 132. An annular outer flange 138 extends radially outwardly from the side wall 132.

With reference to the upper portion of FIG. 6, the coupling member 140 extends from a coupling member distal end 142A to the pipette tip proximal end 102B. The illustrated coupling member 140 includes a base section 144, an integral sealing section 150, and an integral securing section 160. A passage 146 extends through the coupling member 140 from a passage distal end opening 145A to a passage proximal end opening 145B.

The FIG. 6 base section 144 includes an annular or tubular wall 144B defining a coupling member socket 148. In such an embodiment, the coupling member 140 is mounted on the body member proximal portion 130 such that the body member side wall 132 is received in the coupling member socket 148. The mating surfaces 144A and 130A of the coupling member base section 144 and the body member proximal portion 130 are bonded (e.g., by adhesive and/or molding) to one another to firmly secure the coupling member 140 to the body member 110.

The sealing section 150 includes an annular or tubular body 152 and an integral, annular sealing rib 154 extending radially inwardly into the passage 146.

Figure 4:
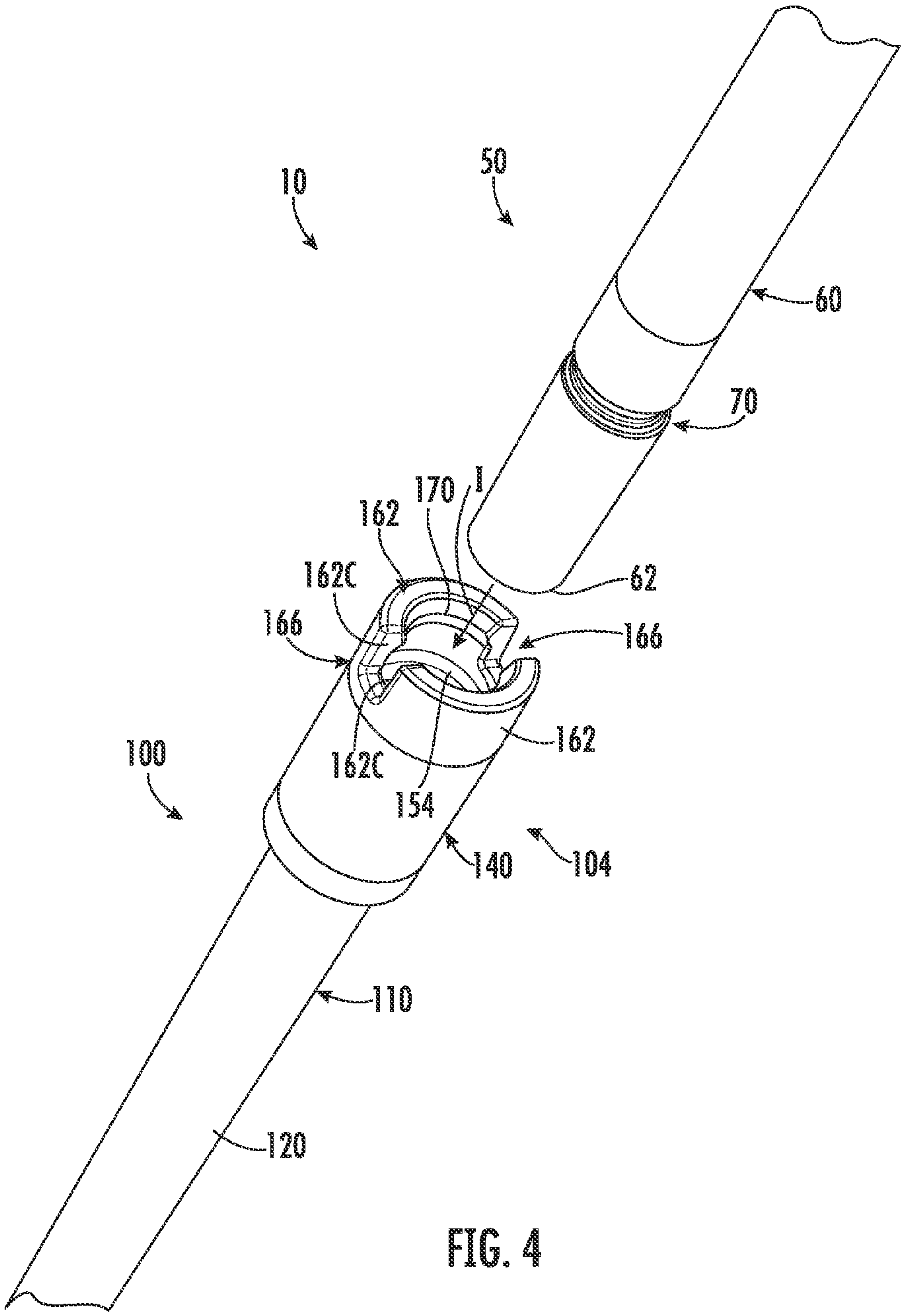
FIG. 4 is a fragmentary, exploded, top perspective view of the pipetting system of FIG. 1.

With reference to FIGS. 1, 4 and 6, the securing portion or securing section 160 includes two diametrically opposed, circumferentially distributed tabs 162 extending axially from the sealing portion 150 in the proximal direction. The tabs 162 define a portion of the passage 146 as well as circumferentially spaced apart slots 166 between the tabs 162 (defined by opposing tab side edges 162C). Each tab 162 is attached or merged at its distal end 162A to the sealing section 150 and has a proximal free end 162B (FIG. 6).

Figure 5:
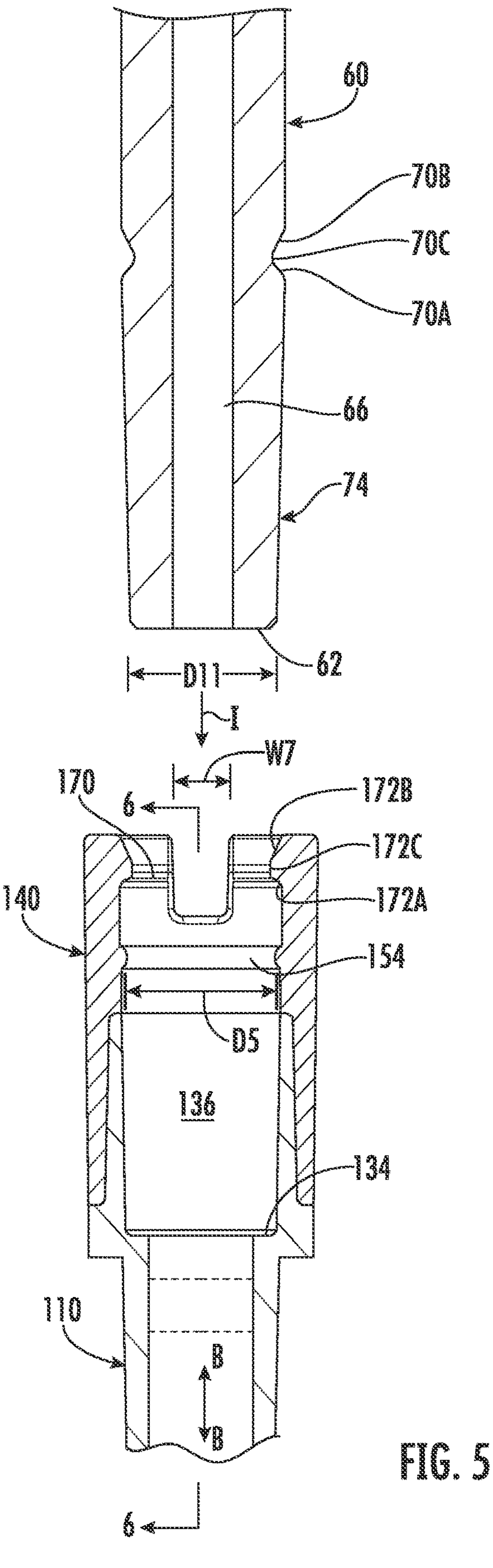
FIG. 5 is a fragmentary, exploded, cross-sectional view of the pipetting system of FIG. 1 taken along the line 2-2 of FIG. 1.

Each tab 162 of the illustrated embodiment includes a circumferentially extending interlock feature or rib 170 located adjacent its proximal free end 162B. In some embodiments and as shown in FIG. 5, the rib 170 includes (in cross-sectional profile) a rib distal section 172A, a rib proximal section 172B, and a rib intermediate section 172C having different rates of taper with respect to the central axis B-B. In some embodiments, the rib distal section 172A tapers in the proximal direction and the rib proximal section 172B tapers in the distal direction. In some embodiments, the rate of taper of the rib distal section 172A is greater than the rate of taper of the rib proximal section 172B. In some embodiments, the rib intermediate section 172C is substantially non-tapered (i.e., cylindrical).

The body member 110 may be formed of any suitable material(s). According to some embodiments, the body member 110 is formed of a polymeric material. According to some embodiments, the body member 110 is formed of a thermoplastic material. Suitable materials for the body member 110 may include polypropylene, polyethylene or similar thermoplastics. According to some embodiments, the body member 110 is monolithic. The body member 110 may be injection molded.

The coupling member 140 may be formed of any suitable material(s). According to some embodiments, the coupling member 140 is formed of a polymeric material. According to some embodiments, the coupling member 140 is formed of an elastomeric material. Suitable materials for the coupling member 140 may include thermoplastic elastomers (TPE). According to some embodiments, the coupling member 140 is monolithic. The coupling member 140 may be injection molded. According to some embodiments, the coupling member 140 is overmolded onto or co-molded with the body member 110 (e.g., dual shot molded). The coupling member 140 forms a fluid-tight seal with the body member 110.

According to some embodiments, the body member 110 is formed of a more stiff or rigid material than the coupling member 140. In particular, in some embodiments, the tabs 162 are formed of a less stiff or rigid (i.e., more flexible) material than the body portion 120. Moreover, in this case, the coupling portion 104 includes a relatively more rigid side wall 132 defining the socket 136 and relatively more flexible tabs 162. According to some embodiments, the body member 110 is formed of a material having a durometer (hardness) of at least 60 Shore D and the coupling member 140 is formed of a material having a durometer of less than 70 Shore A. According to some embodiments, the body member 110 is formed of a material having a durometer in the range of from 60 Shore D to 80 Shore D and the coupling member 140 is formed of a material having a durometer in the range of from 50 Shore A to 70 Shore A.

According to some embodiments, the length L1 (FIG. 2) of the body portion 120 is in the range of from about 10 mm to 125 mm.

According to some embodiments, the maximum inner diameter of the passage 114 is in the range of from about 0.5 mm to 15 mm.

According to some embodiments, the depth H2 (FIG. 6) of the socket 136 is in the range of from about 1 mm to 10 mm. According to some embodiments, the diameter D2 (FIG. 6) of the socket 136 is in the range of from about 1.5 mm to 8 mm.

According to some embodiments, the shoulder 134 has a width W4 (FIG. 6) in the range of from about 0.3 mm to 2.5 mm.

According to some embodiments, the width W5 (FIG. 6) of the sealing rib 154 is in the range of from about 0.01 mm to 2 mm. According to some embodiments, the height H5 (FIG. 6) of the sealing rib 154 is in the range of from about 0.01 mm to 3 mm.

According to some embodiments, the width W6 (FIG. 6) of each interlock tab 162 (not including the interlock rib 170) is in the range of from about 0.3 mm to 3 mm. According to some embodiments, the height H6 (FIG. 6) of each interlock tab 162 is in the range of from about 1 mm to 10 mm. According to some embodiments, the width W7 (FIG. 5) of each slot 166 is in the range of from about 0.1 mm to 5 mm. However, in other embodiment, the slots 166 may be narrowed to slits so that the tabs 162 are positioned substantially edge to edge. In some embodiments, three or more interlock tabs 162 are provided.

According to some embodiments, the width W8 (FIG. 6) of each interlock rib 170 is in the range of from about 0.1 mm to 3 mm. According to some embodiments, the height H8 (FIG. 6) of each interlock rib 170 is in the range of from about 0.1 mm to 6 mm.

With reference to FIGS. 2 and 3, a pipettor device 50 includes a pipettor mandrel or shaft 60 having a shaft axis A-A (FIG. 2) and extending to a shaft distal terminal end 62. A fluid passage 66 extends through the shaft 60 to a shaft distal terminal opening 64 at the shaft distal terminal end 62. The outer surface 68 of the shaft 60 may be generally cylindrical or slightly tapered and includes a circumferentially extending shaft interlock feature or groove 70 formed therein. In some embodiments, the groove 70 is annular and endless. The groove 70 has sections 70A, 70B and 70C (upper portion, FIG. 5) complementary to the rib sections 172A, 172B and 172C (lower portion, FIG. 5), respectively. A distal shaft portion 74 (FIG. 5) extends at least from the groove 70 (FIG. 3) to the shaft distal terminal end 62.

The shaft 60 may be fluidly connected to an actuator 56 (FIG. 1) by a conduit 52. The actuator 56 may be a pump operable to apply a positive or negative pressure to the passage 66 to dispense or aspirate a volume of liquid. The pipettor device 50 may be a manual device (e.g., a manual syringe) or an automated device.

The shaft 60 may be formed of any suitable material(s). In some embodiments, the shaft 60 is formed of metal. In some embodiments, the shaft 60 is formed of a polymeric material.

In use, the pipette tip 100 can be installed on the pipettor shaft 60 as follows in accordance with methods of the present technology. The distal shaft portion 74 is inserted into the socket 136 in an insertion direction I as shown in FIGS. 4 and 5 until the shaft distal terminal end 62 (FIG. 5) abuts the stop shoulder 134 (FIG. 5) as shown in FIGS. 1-3. The stop shoulder 134 thus limits insertion of the pipettor shaft 60 into the coupling portion 104. The stop shoulder 134 may also provide or facilitate concentric alignment between the pipettor shaft 60 and the pipette tip 100.

As the portion 74 is inserted, the tabs 162 are thereby resiliently splayed or deflected radially outwardly in directions R (as shown in dashed lines in FIG. 3). This deflection may include bending in the tabs 162 and/or cantilevering the tabs 162 about the tab distal ends 162A. The tabs 162 are elastically deflected so that they continue to exert a radially compressive return force on the shaft 60. When the interlock ribs 170 become aligned with the interlock groove 70, the tabs 162, and thereby the ribs 170, retract or return radially inwardly and thereby seat the ribs 170 in the groove 70. The distal shaft portion 74 is held captive by the coupling portion 104. In addition to the mechanical interlock engagement between the interlock ribs 170 and the groove 70, the sealing rib 154 and the tabs 162 may apply a radially compressive load on the distal shaft portion 74 and provide frictional resistance to removal of the pipette tip 100.

According to some embodiments, the axial distance L9 (FIG. 3) from the stop shoulder 134 to the interlock ribs 170 is in the range of from about 1 mm to 10 mm. According to some embodiments, the axial distance L10 (FIG. 3) from the terminal end 62 of the pipettor shaft 60 to the interlock groove 70 is substantially the same as the distance L9. As a result, when the proximal shaft portion 74 is properly and fully inserted into the socket 136 to the stop shoulder 134, the interlock ribs 170 will be axially aligned with the interlock groove 70. The ribs 170 and the groove 70 are thus interlocked to resist axial displacement of the pipette tip 100 relative to the pipettor shaft 60.

With the distal shaft portion 74 inserted in the coupling member socket 136, the sealing rib 154 (FIG. 5) sealingly engages the outer surface of the distal shaft portion 74. The inner diameter D5 (FIG. 5) of the sealing rib 154 is less than the outer diameter D11 (FIG. 5) of the distal portion 74. As a result, when the proximal shaft portion 74 is properly and fully inserted into the coupling member socket 136, the sealing rib 154 is elastically deformed by the shaft portion 74 and exerts a radially inwardly compressive force on the shaft outer surface. In this manner, a fluid-tight seal (e.g., in some embodiments, a liquid-tight, a gas-tight or an air-tight seal) is formed between the sealing section 150 and the shaft 60. According to some embodiments, the inner diameter D5 is in the range of from about 0.05 mm to 2 mm less than the outer diameter D11 of the distal portion 74.

In the foregoing manner, the pipette tip 100 is mechanically and removably secured to the pipettor shaft 60. The pipettor fluid passage 66 is fluidly connected to the pipette tip distal opening 115A through the passage 114. The pipette tip 100 sealingly engages (by the sealing rib 154) the pipettor shaft 60 to provide a fluid sealed path. The assembly of the pipette tip 100 and the pipettor device 50 can then be used as desired to dispense, aspirate and/or transport liquids through or with the pipette tip 100 (and, in some embodiments, through or with the pipettor shaft 60) as desired.

When desired, the pipette tip 100 can be removed by withdrawing the pipettor shaft 60 from the coupling member socket 136 in a direction opposite the installation direction I. Upon application of sufficient axial force, the tabs 162 will resiliently deflect radially outwardly again to disengage the ribs 170 from the groove 70. If desired, the removed pipette tip 100 can be replaced with a new pipette tip 100. The new pipette tip 100 can be installed in the same manner as the first pipette tip 100.

For the pipette tip 100 and pipetting systems and methods disclosed herein, the use of deflectable tabs 162 and cooperating interlock features 170, 70 permits a geometry that requires low insertion force while nonetheless providing sufficient resistance to removal of the pipette tip 100 from the shaft 60. The coupling member socket 136 may be sized and configured such that it provides little or no resistance to insertion of the shaft portion 74. Because the tabs 162 are free to deflect outwardly, the frictional drag applied to the shaft 60 by the contacting interlock ribs 170 is reduced. The sealing rib 154 only needs to provide sufficient radial load and contact surface against the shaft portion 74 to form a fluid-tight (e.g., air-tight, liquid-tight, gas-tight) seal, and can therefore be configured to provide relatively low drag on insertion. The distal shaft portion 74 can itself be configured (e.g., by frustoconically tapering in the distal direction) to provide reduced insertion drag. Because only a low insertion force is required, the size and mass of moving mechanisms (e.g., robotic arms that move the pipettor shaft 60) can be significantly reduced.

The sealing rib 154 can eliminate the need to provide a supplemental O-ring on the pipettor shaft 60 to effect a fluid-tight seal with the pipette tip 100. In some embodiments, the sealing rib 154 forms a gas- or vacuum-tight, hermetic seal about the shaft 60. In some embodiments, the seal between the sealing rib 154 and the shaft 60 is adapted to withstand at least 5 psi without leakage.

While an interlock shaft groove 70 and interlock ribs 170 have been shown and described herein, other combinations and configurations of interlock features may be employed. For example, the pipettor shaft 60 may be provided with one or more interlock ribs and the tabs 162 may be provided with cooperating interlock grooves. In this case, the integral interlock rib on the pipettor shaft 60 may be annular and endless. By way of further example, the shaft and the tabs may both be provided with one or more interlock ribs and one or more interlock grooves.

Pipette tips and pipetting systems as disclosed herein may be used with liquid displacement technology or gas or air displacement technology. In liquid displacement technology, liquid is moved through the pipettor shaft 60 (e.g., to or toward a syringe or other pump). In gas displacement technology, the syringe or other pump is used only to create a negative or positive pressure and aspirated liquid stays only in the lower portion of the pipette tip (i.e., the body portion 120) and never contacts the pipettor shaft 60 and the seal of the pipette tip 100. The gas displacement technique is commonly used to prevent cross-contamination of the liquids.

Many alterations and modifications may be made by those having ordinary skill in the art, given the benefit of present disclosure, without departing from the spirit and scope of the technology. Therefore, it must be understood that the illustrated embodiments have been set forth only for the purposes of example, and that it should not be taken as limiting the technology as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the technology.

What is claimed:

1. A pipette tip for use with a pipettor including a pipettor shaft having a terminal end, the pipettor shaft including a shaft interlock feature proximate the terminal end, the pipette tip having opposed proximal and distal ends and comprising:

a tubular body extending between the proximal and distal ends, the tubular body defining a fluid passage terminating at a proximal opening adjacent the proximal end and a distal opening adjacent the distal end; and a coupling portion on the proximal end, the coupling portion including a pipette tip interlock feature configured to mechanically interlock with the shaft interlock feature of the pipettor shaft to selectively and releasably secure the pipette tip to the pipettor shaft;

wherein:

the shaft interlock feature includes a cooperating groove or rib on the pipettor shaft and the pipette tip interlock feature includes a circumferentially extending rib or groove configured to interlock with the cooperating groove or rib on the pipettor shaft;

the coupling portion includes a plurality of integral, circumferentially distributed coupling tabs on the proximal end of the pipette tip;

the coupling tabs are configured to be radially outwardly displaced by the pipettor shaft when the terminal end of the pipettor shaft is inserted into the coupling portion;

the pipette tip interlock feature is located on at least one of the coupling tabs and is configured to be displaced radially outwardly with the at least one of the coupling tabs when the terminal end of the pipettor shaft is inserted into the coupling portion;

the at least one of the coupling tabs is configured to retract radially inwardly when the pipette tip interlock feature thereon becomes aligned with the shaft interlock feature to thereby interlock the pipette tip interlock feature with the shaft interlock feature;

each of the coupling tabs has a distal end and an opposing free proximal end and extends from its distal end to its free proximal end in a direction away from the distal end of the pipette tip, wherein each coupling tab is attached at its distal end to the tubular body;

the coupling portion includes a plurality of circumferentially spaced apart slots defined between the coupling tabs; and the slots are open between the coupling tabs and at the free proximal ends of the coupling tabs such that the slots are open in the direction away from the distal end of the pipette tip.

2. The pipette tip of claim 1 wherein the shaft interlock feature includes a cooperating annular groove on the pipettor shaft and the pipette tip interlock feature includes a circumferentially extending rib configured to interlock with the cooperating annular groove on the pipettor shaft.

3. The pipette tip of claim 1 wherein:

the body and the coupling portion are formed of different materials; and the material of the coupling portion is less stiff than the material of the body.

4. The pipette tip of claim 3 wherein:

the durometer of the material of the body is at least 60 Shore D; and the durometer of the material of the coupling portion is less than 70 Shore A.

5. The pipette tip of claim 3 wherein:

the material of the body includes polypropylene; and the material of the coupling portion includes a thermoplastic elastomer.

6. The pipette tip of claim 1 wherein the coupling portion includes a stop shoulder configured to engage the terminal end and thereby limit insertion of the pipettor shaft into the coupling portion.

7. The pipette tip of claim 1 wherein:

the coupling portion includes an integral, annular sealing rib on an inner diameter; and the sealing rib is adapted to form a fluid-tight seal with an outer diameter of the pipettor shaft when the pipettor shaft is inserted into the coupling portion and the pipette tip interlock feature is interlocked with the shaft interlock feature.

8. The pipette tip of claim 7 wherein the fluid-tight seal is gas-tight up to at least 5 psi.

9. The pipette tip of claim 7 wherein:
the body and the sealing rib are formed of different materials; and
the material of the sealing rib is less stiff than the material of the body.

10. The pipette tip of claim 1 wherein:
the body and the coupling tabs are formed of different materials;
the material of the coupling tabs is less stiff than the material of the body;
the coupling portion includes a stop shoulder configured to engage the terminal end and thereby limit insertion of the pipettor shaft into the coupling portion;
the coupling portion includes an integral, annular sealing rib on an inner diameter;
the sealing rib is adapted to form a fluid-tight seal with an outer diameter of the pipettor shaft when the pipettor shaft is inserted into the coupling portion and the pipette tip interlock feature is interlocked with the shaft interlock feature;
the body and the sealing rib are formed of different materials; and
the material of the sealing rib is less stiff than the material of the body.

11. The pipette tip of claim 1 wherein the tubular body has an outer surface that tapers in a direction from the proximal end of the pipette tip to the distal end of the pipette tip.

12. A method for mounting a pipette tip on a pipettor shaft having a terminal end, the pipettor shaft including a shaft interlock feature proximate the terminal end, the method comprising:
providing a pipette tip having opposed proximal and distal ends, the pipette tip including:
a tubular body extending between the proximal and distal ends, the tubular body defining a fluid passage terminating at a proximal opening adjacent the proximal end and a distal opening adjacent the distal end; and
a coupling portion on the proximal end, the coupling portion including a pipette tip interlock feature configured to mechanically interlock with the shaft interlock feature of the pipettor shaft to selectively and releasably secure the pipette tip to the pipettor shaft; and
inserting the terminal end of the pipettor shaft into the coupling portion to mechanically interlock the pipette tip interlock feature with the shaft interlock feature of the pipettor shaft and thereby releasably secure the pipette tip to the pipettor shaft;
wherein:
the shaft interlock feature includes an integral, cooperating groove or rib on the pipettor shaft and the pipette tip interlock feature includes an integral, circumferentially extending rib or groove that interlocks with the cooperating groove or rib on the pipettor shaft when the terminal end of the pipettor shaft is inserted into the coupling portion;
the coupling portion includes a plurality of integral, circumferentially distributed coupling tabs;
the coupling tabs are radially outwardly displaced by the pipettor shaft when the terminal end of the pipettor shaft is inserted into the coupling portion; and
the pipette tip interlock feature is located on at least one of the coupling tabs and is displaced radially outwardly with the at least one of the coupling tabs when the terminal end of the pipettor shaft is inserted into the coupling portion.

13. The method of claim 12 wherein:
the coupling portion includes a stop shoulder that engages the terminal end and thereby limits insertion of the pipettor shaft into the coupling portion when the terminal end of the pipettor shaft is inserted into the coupling portion;
the coupling portion includes an integral, annular sealing rib on an inner diameter;
the sealing rib forms a fluid-tight seal with an outer diameter of the pipettor shaft when the pipettor shaft is inserted into the coupling portion and the pipette tip interlock feature is interlocked with the shaft interlock feature;
the body and the sealing rib are formed of different materials; and
the material of the sealing rib is less stiff than the material of the body.

14. A pipetting system comprising:
a pipettor including a pipettor shaft having a terminal end, the pipettor shaft including a shaft interlock feature proximate the terminal end; and
a pipette tip having opposed proximal and distal ends and including:
a tubular body extending between the proximal and distal ends, the tubular body defining a fluid passage terminating at a proximal opening adjacent the proximal end and a distal opening adjacent the distal end; and
a coupling portion on the proximal end, the coupling portion including a pipette tip interlock feature configured to mechanically interlock with the shaft interlock feature of the pipettor shaft to selectively and releasably secure the pipette tip to the pipettor shaft;
wherein:
the shaft interlock feature includes an integral, cooperating groove or rib on the pipettor shaft and the pipette tip interlock feature includes an integral, circumferentially extending rib or groove configured to interlock with the cooperating groove or rib on the pipettor shaft;
the coupling portion includes a plurality of integral, circumferentially distributed coupling tabs;
the coupling tabs are configured to be radially outwardly displaced by the pipettor shaft when the terminal end of the pipettor shaft is inserted into the coupling portion; and
the pipette tip interlock feature is located on at least one of the coupling tabs and is configured to be displaced radially outwardly with the at least one of the coupling tabs when the terminal end of the pipettor shaft is inserted into the coupling portion.

15. The pipetting system of claim 14 wherein the shaft interlock feature includes a cooperating annular groove on the pipettor shaft and the pipette tip interlock feature includes a circumferentially extending rib configured to interlock with the cooperating annular groove on the pipettor shaft.

16. The pipetting system of claim 14 wherein:
the body and the coupling portion are formed of different materials; and
the material of the coupling portion is less stiff than the material of the body.

17. The pipetting system of claim 16 wherein:
the material of the body includes polypropylene; and
the material of the coupling portion includes a thermoplastic elastomer.

18. The pipetting system of claim 14 the coupling portion includes a stop shoulder configured to engage the terminal end and thereby limit insertion of the pipettor shaft into the coupling portion.

19. The pipetting system of claim 14:
the coupling portion includes an integral, annular sealing rib on an inner diameter; and
the sealing rib is adapted to form a fluid-tight seal with an outer diameter of the pipettor shaft when the terminal end of the pipettor shaft is inserted into the coupling portion and the pipette tip interlock feature is interlocked with the shaft interlock feature.

20. The pipetting system of claim 14 wherein:
the coupling portion includes a stop shoulder configured to engage the terminal end and thereby limit insertion of the pipettor shaft into the coupling portion;
the coupling portion includes an integral, annular sealing rib on an inner diameter;
the sealing rib is adapted to form a fluid-tight seal with an outer diameter of the pipettor shaft when the pipettor shaft is inserted into the coupling portion and the pipette tip interlock feature is interlocked with the shaft interlock feature;
the body and the sealing rib are formed of different materials; and
the material of the sealing rib is less stiff than the material of the body.

* * * * *